Patented Dec. 2, 1924.

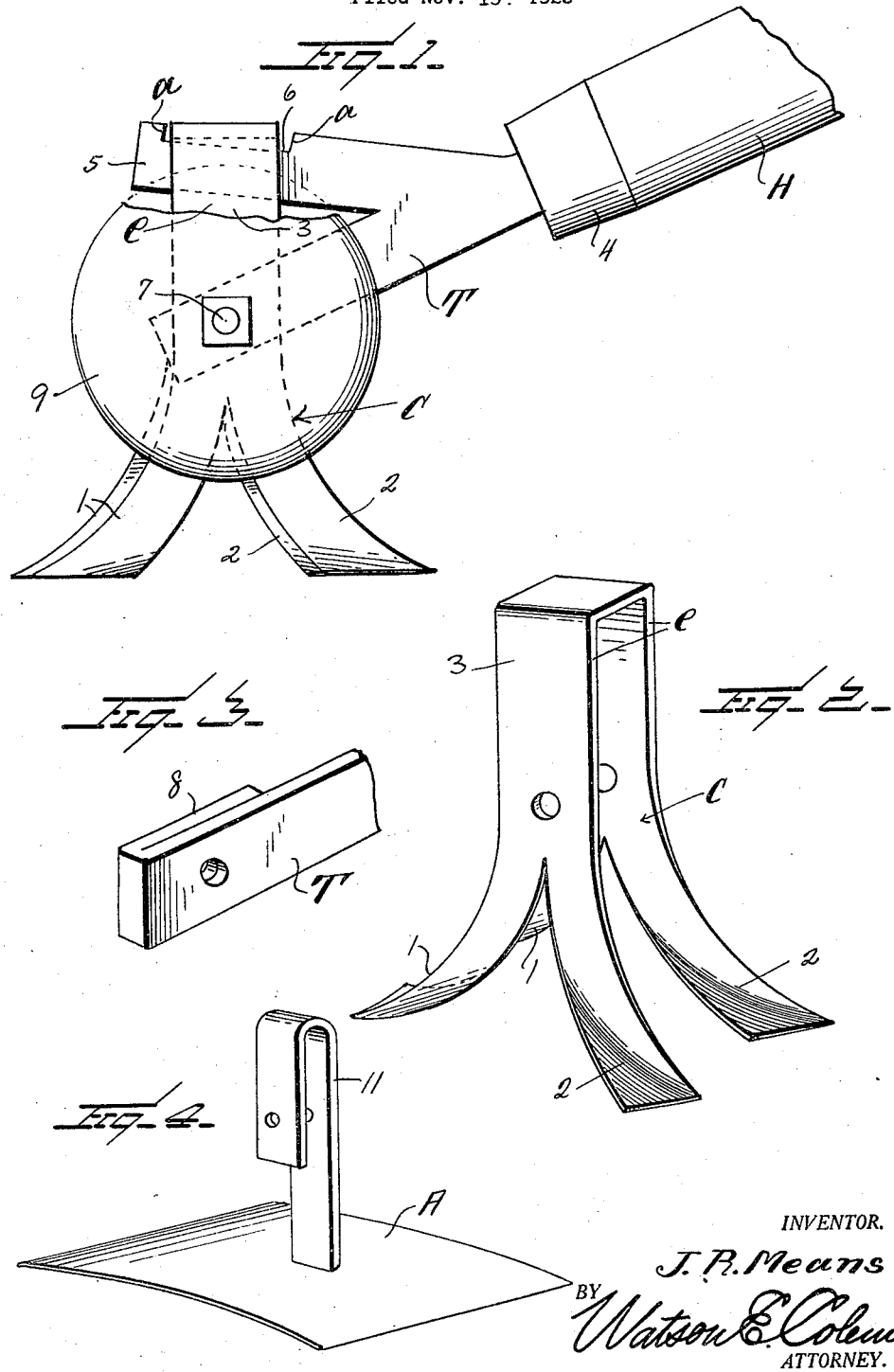

1,517,572

UNITED STATES PATENT OFFICE.

JOHN R. MEANS, OF SOUTH FORK, ARKANSAS.

GROUNDWORKING IMPLEMENT.

Application filed November 19, 1923. Serial No. 675,704.

*To all whom it may concern:*

Be it known that I, JOHN R. MEANS, a citizen of the United States, residing at South Fork, in the county of Fulton and State of Arkansas, have invented certain new and useful Improvements in Groundworking Implements, of which the following is a specification, reference being had to the accompanying drawings.

This invention relates to certain improvements in ground working implements and has relation more particularly to a device of this general character of a hand type and it is an object of the invention to provide an implement of this kind having novel and improved means whereby the ground working member is operatively engaged with a handle in a manner whereby said member is capable of limited swinging or vibratory movement in order to facilitate the proper working action upon the soil.

Another object of the invention is to provide a device of this general character embodying novel and improvel means whereby the same may be readily and effectively secured to an operating handle and in a manner to facilitate the removal or application of the member whereby one character of ground working member may be substituted for another in accordance with the requirements of practice.

The invention consists in the details of construction and in the combination and arrangement of the several parts of my improved ground working implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating a ground working implement constructed in accordance with an embodiment of my invention;

Figure 2 is a view in perspective of the working member of the implement unapplied;

Figure 3 is a view in perspective of the outer end portion of the tang as herein employed;

Figure 4 is a view in perspective of the implement constructed in accordance with a further embodiment of my invention.

As disclosed in the accompanying drawings, C denotes a cultivator formed from a single piece of material and provided with the front prongs 1 and the rear prongs 2, each set of prongs being disclosed as two in number. Each of the prongs 1 and 2 is formed of a flat piece of material having the lower portions thereof gradually twisted so that the working end of said prong is substantially in the form of a turning plow with the throw of the front prongs 1 toward the right and of the rear prongs toward the left. The intermediate portion of the cultivator C is formed to provide an upstanding open loop or bow 3 with the open end below.

An elongated tang T is adapted to be engaged in a conventional manner within a handle H and with which is associated in a well known way a ferrule 4. The outer portion of the tang T is provided with an angularly disposed arm 5 provided in its upper portion with an elongated notch or recess 6, said recess being of a length in excess of the width of the intermediate or upper portion of the bow or loop 3 and which portion of said bow or loop 3 is received within said notch or recess 6.

The end walls $a$ of the notch or recess 6 provide stops to limit the swinging or vibratory movement of the cultivator C with respect to the tang T. The tang T outwardly of the arm 5 extends through the lower portion of the bow or loop 3 and is pivotally connected therewith through the instrumentality of the removable bolt 7 disposed through the side members $e$ of the bow or loop 3 and through the outer end portion of the tang T.

The outer extremity of the tang T is returned to provide an inwardly disposed arm 8 substantially in parallelism with the tang T and through which the bolt 7 is also disposed. This arm 8 coacts with the adjacent portion of the tang to provide a relatively wide bearing for the bolt 7 so that the efficiency of the implement is materially increased.

The swinging movement of the cultivator C relative to the tang T and its associated handle H permits the cultivator C to oscillate or swing to an extent whereby it will properly adjust itself to the backward and forward scope of the implement during a working operation. In order to limit the extent or depth of penetration of the bow in the soil I find it of advantage to mount upon the bolt 7 and extending within the bow 3 the wheel 9, said wheel being preferably of light construction although I do not wish to be understood as limiting myself to any particular character of wheel.

The tang T may be readily disengaged from the cultivator C by removal of the bolt 7 and by this means the tang T can be readily employed with implements of other characters such as a hoe A as illustrated in Figure 4 and which hoe includes the upstanding loop or bow 11 with which the tang is adapted to be engaged in the same manner as hereinbefore set forth with respect to the cultivator C. In view of this it will be readily understood that a set of different ground working members may be employed and that only a single tang and its handle is necessary, as said tang may be readily applied to the character of implement desired to be used owing to the simple and effective manner whereby said tang may be either applied to or removed from a working member.

From the foregoing description it is thought to be obvious that a ground working implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a ground working implement provided with an outstanding bow member, a tang, means for pivotally connecting the tang through the bow member, and an angularly disposed arm carried by the tang and extending through the bow member, said arm being provided with spaced shoulders at opposite sides of the bow member to limit the swinging movement of the member in either direction relative to the tang.

2. In combination with a ground working implement provided with an outstanding bow member, a tang, means for pivotally connecting the tang through the bow member, and an angularly disposed arm carried by the tang and extending through the bow member, said arm being provided with spaced shoulders at opposite sides of the bow member to limit the swinging movement of the member in either direction relative to the tang, said arm extending through the bow member above the pivotal connection of the tang with the bow member.

3. In combination with a ground working implement provided with an outstanding bow member, a tang, a member for pivotally connecting the tang to the bow member, an angularly disposed arm carried by the tang and extending through the bow member, said arm being provided with spaced shoulders at opposite sides of the bow member to limit the swinging movement of the member in either direction relative to the tang, and means carried by said pivotal member for limiting the extent of penetration of the first named member.

4. In combination with a ground working implement provided with an outstanding bow member, a tang, a member for pivotally connecting the tang to the bow member, an angularly disposed arm carried by the tang and extending through the bow member, said arm being provided with spaced shoulders at opposite sides of the bow member to limit the swinging movement of the member in either direction relative to the tang, and a wheel mounted upon the pivotal member to limit the extent of penetration of the first named member.

In testimony whereof I hereunto affix my signature.

JOHN R. MEANS.